United States Patent [19]

Larsen

[11] 4,075,487

[45] Feb. 21, 1978

[54] IONIZATION CHAMBER ASSEMBLY

[75] Inventor: Larry D. Larsen, Palatine, Ill.

[73] Assignee: Patent Development & Management Company, Elgin, Ill.

[21] Appl. No.: 686,590

[22] Filed: May 14, 1976

[51] Int. Cl.[2] .......... G01T 1/18

[52] U.S. Cl. .......... 250/385; 250/381; 340/237 S

[58] Field of Search .......... 250/381, 385, 389; 340/237 S

[56] References Cited

U.S. PATENT DOCUMENTS

| | | | |
|---|---|---|---|
| 3,767,917 | 10/1973 | Lampart et al. | 250/385 X |
| 3,832,552 | 8/1974 | Larsen et al. | 250/381 |
| 3,838,283 | 9/1974 | Andersson | 250/381 |
| 3,946,374 | 3/1976 | McMillian et al. | 250/381 X |

*Primary Examiner*—Archie R. Borchelt

[57] ABSTRACT

Two cup-shaped electrodes respectively defining outer walls of a closed and an open ionization chamber and an insulator wall sandwiched therebetween defining an interior wall of both chambers and carrying both an electrode common to both chambers and at least one circuit element of a sensing circuit responsive to the relative impedances of the two chambers for indicating the presence of smoke in the open chamber. Minimizing leakage current-increasing factors as moisture, dust, etc., the body of the circuit element is protectively mounted to the insulator wall within the closed chamber by means of a plurality of leads extending through mating holes in the insulator wall with a header surface of the body pressed against the wall. One of the leads is folded around the edge of a hole in the wall wherein the common electrode is mounted and is squeezed between the insulator wall and a part of the common electrode to make electrical contact therewith. Some of the leads which extend out of the chamber for connection with external circuitry are sandwiched between an insulator member and the wall and thereby insulated against electrical contact with either of the cup-shaped electrodes. The insulator member is integrally formed with the insulator wall by cutting a portion thereof away from the wall to form the electrode mounting hole and folding it to overlie the leads and the wall.

56 Claims, 7 Drawing Figures

IONIZATION CHAMBER ASSEMBLY

BACKGROUND OF THE INVENTION

This invention relates to an ionization chamber assembly for use with a smoke detector and, more particularly, to such an assembly having both an open sensing chamber and a closed reference chamber.

Double chamber ionization chamber assemblies are well known. One such type of assembly has a pair of cup-shaped electrodes respectively defining the outer walls of an open sensing chamber and a closed reference chamber. An interior wall is interposed between the two cup-shaped electrodes and defines an interior wall of both chambers. The wall also carries a centrally located electrode common to both chambers. Smoke detection circuits employing such assemblies apply a voltage across the assembly between the two cup-shaped electrodes and monitor the voltage developed at the common electrode. Thus, voltage varies as an impedance voltage divider output when smoke or other products of combustion enter the sensing chamber and increase its impedance relative to that of the closed reference chamber.

A problem associated with this type of chamber assembly and others which have an electrode contained within a conductive envelope is the provision of an inexpensive means to connect external circuitry with the center electrode without making electrical contact with the conductive envelope. A functionally successful, but relatively expensive, approach to this problem, shown in U.S. Pat. No. 3,832,552 of Larsen et al issued Aug. 27, 1974, to Honeywell, Inc., is to mold the insulator wall with the metal conductor protectively embedded therewithin and thereby insulated against connection with the cup-shaped electrodes.

The impedance of the ionization chambers is extremely high, and thus the current therethrough giving rise to the detection signal is very low, being in the range of a few pico-amperes. Accordingly, it is extremely important that the circuit element connected with the center electrode and used to detect these currents be virtually devoid of leakage currents between the various terminals thereof and between individual ones of the terminals and the different parts of the ionization chamber assembly. Typically, field effect transistors, or the like, are used as this circuit element because of their high input impedance and their inherently low leakage current characteristics. However, even with such devices, moisture, dust and the like, particularly at the header surface of the device from which the leads protrude, can result in the development of leakage currents having sufficiently large magnitudes relative to the very low ionization chamber current that proper response to the ionization current is prevented.

The several known approaches which have been taken to minimize such leakage current have also significantly increased manufacturing cost. For example, in U.S. Pat. No. 3,681,603 of Scheidweiler et al, issued Aug. 1, 1972, to Cerberus A. G., a separate cavity in a mounting member of the detector is provided for protectively enclosing the sensing circuit. In U.S. Pat. No. 3,710,110 of Lampart et al, issued Jan. 9, 1973, to Cerberus A. G., the detection circuitry is mounted between two center electrodes and protectively encapsulated in a moisture-impervious insulating material. A structurally complicated ionization chamber assembly having a reference chamber mounted within a sensing chamber is disclosed in U.S. Pat. No. 3,500,368 of Abe, issued Mar. 10, 1970, to Nittan Company, Limited, in which the body of a field-effect transistor is mounted in a hole of an insulator member defining a wall of the reference chamber. Another known approach to protect the header has been to coat it with a moisture-impervious enamel.

SUMMARY OF THE INVENTION

The principal object of the present invention is to provide an ionization chamber assembly of reduced cost which is made from fewer, less expensive, and more readily assembled parts than known assemblies.

More particularly, an object is to provide a simple but effective manner of providing an output terminal for an electrode contained within a conductive envelope of an ionization chamber.

A further object of this invention is to provide in an ionization chamber assembly an improved manner of mounting a circuit element within a chamber of the assembly and of connecting leads thereof with appropriate parts of the assembly.

Yet another object is to provide an ionization chamber assembly having those features noted above and in which a header of a circuit element is mounted within a chamber of the assembly in such a fashion as to minimize leakage currents, but without significantly increasing the cost of the assembly.

These objectives are achieved and other advantages are realized in an ionization chamber assembly of the type having a pair of cup-shaped electrodes defining outer walls of a closed reference chamber and an open sensing chamber, respectively, and an insulator wall defining an inner wall common to both chambers and carrying a common electrode for both chambers spaced from the cup-shaped electrodes. Carried by the common electrode is radioactive material for ionizing the air within the respective chambers.

In keeping with one aspect of the invention, at least the circuit element connected with the center electrode of a smoke sensing circuit is mounted within the closed chamber. At least one of a plurality of leads extending from a body of the circuit element is snugly fitted through a mating hole in the insulator wall and is bent to overlie the wall on the side opposite the body. A part of the common electrode overlies the insulator wall and the one lead is sandwiched between the wall and that part of the common electrode to both make electrical contact therewith and to secure it, and thus the circuit element body, to the wall.

In accordance with another aspect of the invention, an insulator member is provided at the periphery of the cup-shaped electrode adjacent the circuit element to insulate some of the circuit element leads against electrical contact with the cup-shaped electrodes. The leads are sandwiched between the insulator wall and the insulator member as they extend from within to without the chamber between the peripheral edge surfaces of the cup-shaped electrodes. The common electrode is mounted within a hole in the insulator wall, and, reducing cost and simplifying assembly, the insulator member is cut from the hole and folded along an edge of the hole to overlie the insulator wall. At least one of the leads of the element extends through both the insulator wall and the insulator member to hold the member in place. Alternately, in an embodiment in which a circuit element is not mounted within one of the chambers, the insulator member is employed to protect a single lead connected with the common electrode and extending out of the assembly for connection with external circuitry.

The foregoing objects and advantageous features of the invention will be made more apparent, and further advantageous features of the invention will be disclosed in the detailed description of the preferred embodiment.

BRIEF DESCRIPTION OF THE DRAWING

The detailed description of the preferred embodiment will be given with reference to the several views of the drawing in which.

DESCRIPTION OF THE PREFERRED EMBODIMENT

Figure 1:
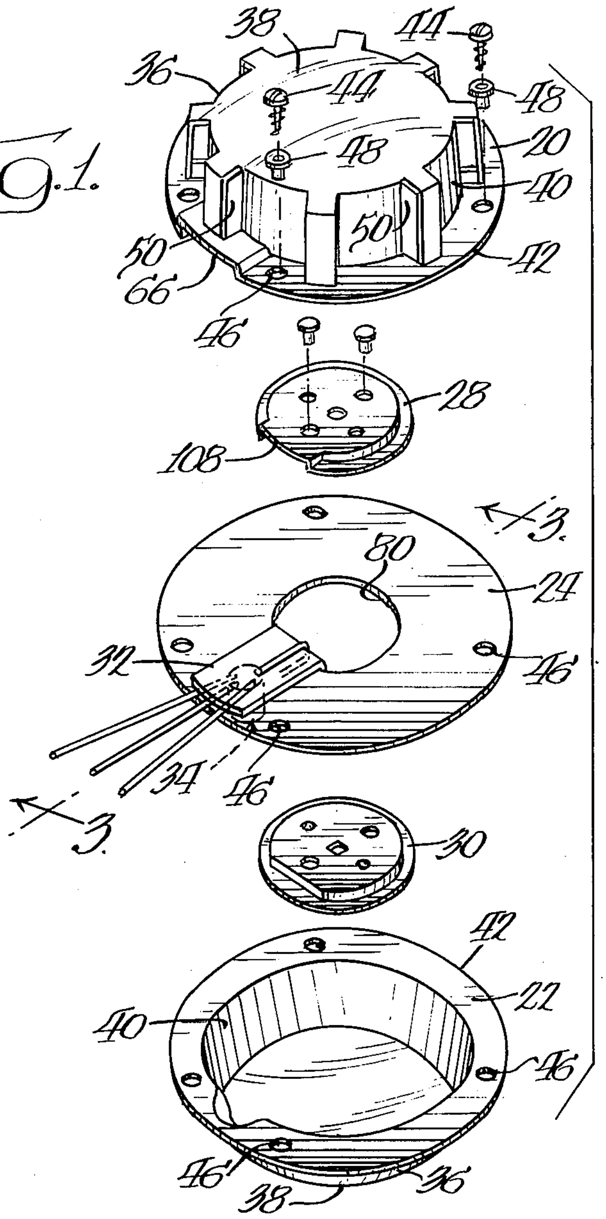
FIG. 1 is an exploded view of the preferred form of the ionization chamber assembly of the present invention.
Figure 3:
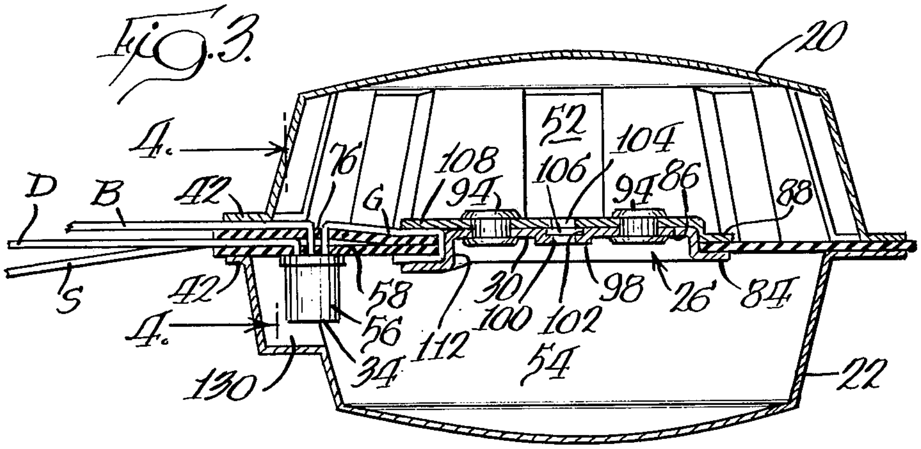
FIG. 3 is a vertical sectional view of the assembly taken approximately along section line 3—3 of FIG. 1, with the elements of the assembly in assembled relationship.

Referring to the drawing, particularly FIGS. 1 and 3, the preferred form of the ionization chamber assembly of the present invention is seen to include a first cup-shaped electrode 20, a second cup-shaped electrode 22, an insulator wall 24, and a common electrode 26, FIG. 3. The common electrode is defined by a top collector plate 28 and a bottom collector plate 30, and which, like the two cup-shaped electrodes, are made from a suitable metal. The assembly also includes an insulator member 32 and a circuit element, such as a field-effect transistor or FET 34, both of which are carried by the insulator wall 24. Both the insulator wall 24 and the insulator member 32 are made from an insulating material such as Teflon.

The two cup-shaped electrodes 20 and 22 are the same general shape and dimension, each having a cup portion 36 with a top 38 and a truncated conical side wall 40 joined with the top 38 at one end and having an open face at the other end joined to an annular lip 42 extending around the periphery thereof. The two cup-shaped electrodes 20 and 22 preferably have generally, circular cross sections for purposes of symmetry and ease of manufacturing. However, it should be understood that the term "cup-shaped electrodes," when used herein, is not intended to be limited to circular cup-shaped electrodes but includes cup-shaped electrodes having square and other noncircular cross-sectional shapes. When assembled, as shown in FIG. 3, the circular insulator wall is sandwiched between the two cup-shaped electrodes 20 and 22 at the respective annular lips 42 thereof, and all three elements are secured together by means of four screws or other fasteners 44 (only two shown) extending through aligned holes 46 in each of the two cup-shaped electrodes 20 and 22 and the insulator wall 24. If screws 44 are metal, each screw 44 is fitted through a shoulder washer or bushing 48 to prevent the screw 44 from electrically coupling the cup-shaped electrodes 20 and 22.

The insulator wall 24, together with the common electrode 26 when mounted thereto, divides the assembly into two chambers and defines an inner wall common to both chambers. The first cup-shaped electrode 20 has a plurality of vent openings 50 to allow the entry of smoke and other products of combustion, and defines the outer wall of an open or sensing chamber 52, as best illustrated in FIG. 3. The second cup-shaped electrode 22, in turn, defines the outer wall of a closed or reference chamber 54.

Figure 4:
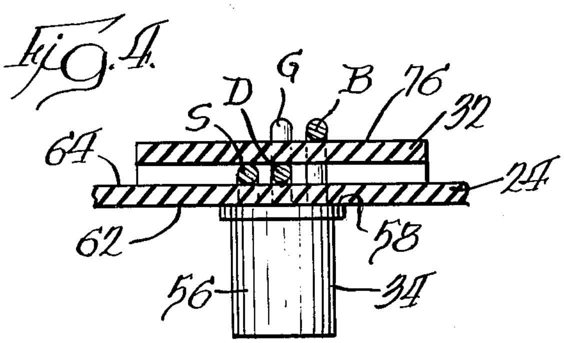
FIG. 4 is a vertical sectional view taken along the line 4—4 of FIG. 3, illustrating the relationship between the various leads of the circuit element and the insulator member and insulator wall.
Figure 5:
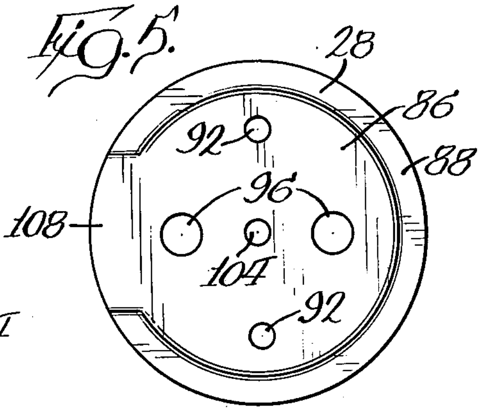
FIG. 5 is a bottom plan view, drawn twice the actual size, of the top collector plate also seen in FIG. 1.
Figure 6:
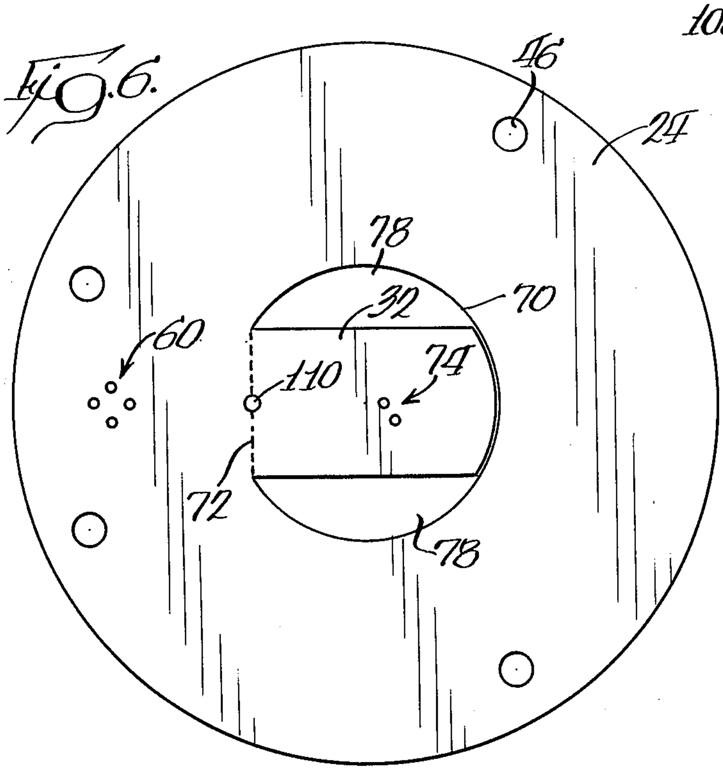
FIG. 6 is a top plan view of the insulator wall shown in perspective in FIG. 1.

Referring also to FIGS. 4 and 6, the FET 34 is mounted to insulator wall 24 within closed chamber 54 in a unique and advantageous fashion. FET 34 has a body 56 with a header 58 from which projects a gate lead G, a source lead S, a drain lead D, and a bulk or substrate lead B. As best seen in FIG. 6, the insulator wall 24 has four lead holes 60 extending therethrough and aligned with one another to snugly receive therethrough the four leads S, D, G and B, respectively associated therewith. A snug fit of each of the leads within its respective lead hole 60 seals the hole 60 to prevent the entry of smoke, etc., therethrough. The header surface 58 is protectively pressed up against the bottom surface 62 of insulator wall 24 and the source lead S and the drain lead D are folded over the top surface 64 of insulator wall 24 so that a portion of the insulator wall 24 adjacent FET 34 is held between the leads S and D and the header surface 58.

Referring still to FIGS. 3 and 4, a particularly advantageous feature of the assembly is that the source and drain leads S and D are sandwiched between the insulator member 32 and insulator wall 24 at annular lips 42 and are thereby protected against electrical contact with either the first cup-shaped electrode 20 or the second cup-shaped electrode 22. As seen in FIG. 1, the annular lip 42 of the first cup-shaped electrode 20 is provided with upturned portion 66 dimensioned to allow the leads and insulator member 32 to extend therethrough while maintaining a tight, flush fit between the annular lips 42 and the insulator wall 24 around the remaining portions thereof.

Referring particularly to FIGS. 1 and 6, the insulator member 32 is integrally formed with insulator wall 24 by cutting it free from a central segment 70 thereof and folding it along a score line 72 to overlie the insulator wall 24 at its edge adjacent annular lips 42. This prevents the insulator wall 24 and insulator member 32, which must be used as a pair, from becoming separated from one another and also results in the insulator member 32 being inherently maintained in the proper position for protectively insulating the leads S and D.

Insulator member 32 is also provided with two lead holes 74 which are aligned with the two lead holes 60 provided for gate lead G and bulk lead B when the insulator member 32 is folded about its score line 72 to overlie the outer edge of insulator wall 24. Each of gate lead G and bulk lead B extends through both its associated lead hole 60 in wall 24 and the lead hole 74 of insulator member 32 aligned therewith. Bulk lead B, upon emerging from the top surface 76, is bent over the top surface 76 and extends out of the open chamber 52 between the top surface 76 and the annular lip 42 of the first cup-shaped electrode 20. Bulk lead B thereby makes electrical contact with the first cup-shaped electrode 20 and provides an output terminal for connecting it, and thus the first cup-shaped electrode 20, with external circuitry.

Leads B and G thus hold the insulator member 32 in position overlying leads S and D adjacent annular lips 42. Because the insulator member 32 is held in the proper position, assembling the insulator wall 24 with the two cup-shaped electrodes is simplified. It should be appreciated that this technique of holding the insulator member 32 in the correct position prior to assembly can be used even in the case when the insulator member 32 is not integrally formed with or otherwise secured to the insulator wall 24.

Side sections 78 of central segment 70 are cut entirely away from insulator wall 24 and together with the part of segment 70 forming insulator member 32 define an electrode mounting hole 80 illustrated in FIGS. 1 and 3. The mounting hole is a partial circle terminated along a chordal line coincident with score line 72. The bottom collector plate has a boss 82 which extends upwardly from a peripheral shoulder 84. The boss 82 has a shape conforming to that of hole 80 and is fitted into both hole 80 and a mating cavity 86 of top collector plate 28. Cavity 86 is partially surrounded by a peripheral shoulder 88 similar to shoulder 84.

The noncircular shape of boss 82 and hole 80 prevents boss 82 from being inserted into hole 80 in a misaligned position. A pair of nipples 90 extending upwardly from boss 82 and fitted into a pair of alignment holes 92 holds the top collector plate 28 in proper alignment with both bottom collector plate 30 and mounting hole 80 during assembly. The collector plates 28 and 30 are secured together by means of a pair of rivets 94 extending through a complementary pair of aligned rivet holes 96 in each of collector plates 28 and 30.

Figure 7:
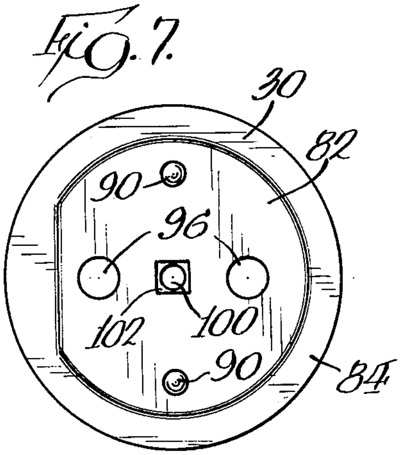
FIG. 7 is a top plan view of the bottom collector plate of the assembly shown in perspective in FIG. 1.

The radiation source for both chambers 52 and 54 is carried by the common electrode 26. As seen in FIGS. 3 and 7, the bottom surface of the bottom collector plate 30 has a boss 98 with a circular radiation emission hole 100 communicating with a larger square cavity 102 which, in turn, communicates with the top surface of collector plate 30. The top collector plate 28 is likewise provided with a radiation emission hole 104 of the same dimension as hole 100 and aligned therewith. Snugly fitted into cavity 102 is a radiation wafer 106 having a suitable amount of radioactive material, such as americium, on the top and bottom surfaces thereof respectively aligned with radiation emission holes 100 and 104 to ionize the air within chambers 52 and 54, respectively. The wafer 106 is held between the shoulders respectively defined between the cavity 102 and hole 100 and the bottom surface of the top collector plate 28 around the edge of radiation emission hole 104 overlying cavity 102 and wafer 106. The wafer 106 simultaneously provides the source of radiation and blocks communication between hole 104 and hole 100 to keep the reference chamber 54 free from the products of combustion.

Meeting another objective of the invention, a segment of the gate lead G is squeezed between the insulator member 32 and a radial extension 108 of cavity 86 to make electrical contact with the top collector plate 28. Assuring contact with the common electrode 26, the gate lead G is bent around the insulator wall 24 and has another segment sandwiched between the bottom surface of insulator wall 24 and the top surface of shoulder 84 to make electrical contact with bottom electrode 30. The gate lead G is fitted within a semi-circular notch formed by means of a circular hole 110 extending through the insulator wall 24 and centered along score line 72. The notch 80 functions to maintain lead G in a proper position prior to assembly with collector plates 28 and 30. Notch 80 is also provided to prevent lead G from obstructing a snug fit of boss 82 within hole 80. The lead G does, however, make contact with a shoulder 112 between upturned portion 82 and shoulder 84 to further assure electrical contact with the common electrode 26.

It should be appreciated that this technique for connecting gate lead G with the common electrode 26 and the technique used to provide output terminals for the drain and source leads by sandwiching them between the insulator wall 24 and insulator member 32 may be employed together to provide an output terminal for the common electrode 26 in the event it is desired to provide an assembly without FET 34 mounted therewithin. Such an output terminal for the common electrode is illustrated in FIG. 4 by considering leads G and D as being connected together at a point between the insulator wall 24 and insulator member 32, and the connections thereof with the FET 34 as being broken.

Referring again to FIGS. 1 and 3, it is seen that the side wall of the second cup-shaped electrode 22 is provided with a hollow 130 for receipt of FET 34. The hollow 130 permits the FET 34 to be mounted adjacent the periphery of the assembly and thus out of the radiation field generated in the reference ionization chamber 54 without the necessity of increasing the diameter of the chambers. This also enables mounting each of the radiation source, the common electrode, and the FET 34 substantially flush to the insulator wall 24.

Figure 2:
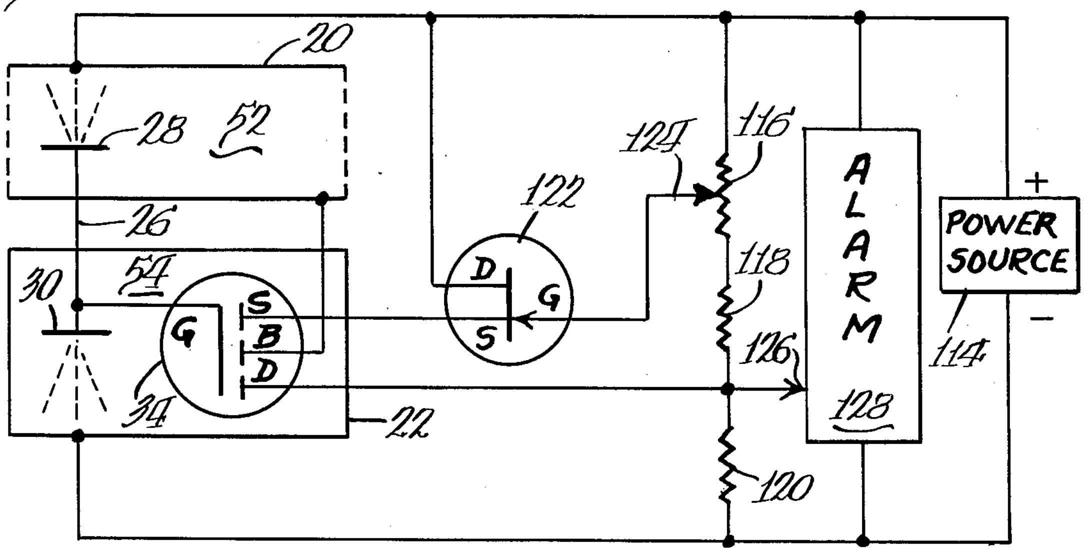
FIG. 2 is a circuit schematic of an ionization fire alarm in which the ionization chamber assembly may be employed, and which illustrates the electrical relationships between the various leads of the circuit element and the different electrodes of the assembly.

Referring to FIG. 2, it is seen that the mounting arrangement for FET 34 not only protectively encloses it within the reference ionization chamber 54, but also inherently results in connection of the gate lead G with the common electrode 26, the bulk lead B with the first cup-shaped electrode 20, and provides output terminals for the source lead S and the drain lead D which are insulated from all the electrodes and the other leads. Accordingly, the ionization chamber assembly may be readily connected for use with a smoke sensing circuit of an ionization fire alarm of the type shown in FIG. 2.

Reference may be had to the copending U.S. application Ser. No. 638,843 filed Dec. 8, 1975, of Larry D. Larsen entitled "Smoke Sensing Fire Alarm" for a complete description of this circuit.

Briefly, the voltage from a DC power source 114 is applied across the series connection of the ionization chambers 52 and 54 and also across a voltage divider defined by series-connected potentiometer resistor 116 and fixed resistors 118 and 120. Another field-effect transistor 122 of the sensing circuit has its source connected with the source of FET 34, its drain connected with the first cup-shaped electrode 20, through connection with bulk lead B, for instance, and its gate connected through a wiper terminal 124 of potentiometer resistor 116 to form a bridge circuit. When the voltage at the common electrode 26 assumes a value approximately equal to the potentiometer voltage at wiper 124 in response to the entry of smoke into sensing chamber 52, both FET 122 and FET 34 turn on to provide energizing current at an input 126 of an alarm circuit 128 to sound an alarm.

It should, of course be appreciated that the ionization chamber assembly and the various advantageous features thereof can be successfully employed with ionization fire alarms and sensing circuits other than those shown in FIG. 2, and that the circuit of FIG. 2 is shown only by way of illustration.

It will also be appreciated by persons familiar with integrated circuits that, if integrated, the entire or at least a substantial portion of the smoke sensing circuit of FIG. 2 or other like circuit could be housed in a body of comparable size as that of FET 34 and mounted within the closed chamber 54.

I claim:

1. In an ionization smoke detector having a sensing circuit responsive to the relative impedances of a closed and an open ionization chamber, an ionization chamber assembly, comprising:

- a first cup-shaped electrode defining an outer wall of the closed ionization chamber;
- a second cup-shaped electrode defining an outer wall of the open ionization chamber;
- a third electrode;
- an insulator wall intermediate the first and second electrodes and carrying said third electrode spaced therefrom, said insulator wall defining an interior wall of both the closed and open ionization chambers; and
- a circuit element of the sensing circuit having a body protectively mounted within the closed chamber by means of at least one of a plurality of leads of the element projecting from the body and extending through the insulator wall into the open chamber.

2. The ionization smoke detector of claim 1 in which said circuit element body has a header from which said plurality of leads project and said body is mounted on the insulator wall with the header thereagainst, said insulator wall protectively covering said header to minimize leakage currents between said leads caused by moisture or the like.

3. The ionization smoke detector of claim 2 in which said wall has a plurality of holes and said plurality of leads extend through said wall within said plurality of holes, respectively, said insulator being interposed between each of said leads adjacent the header.

4. The ionization smoke detector of claim 1 in which said wall has a hole for each of said leads extending through the wall and each hole is dimensioned to snugly fit with its associated lead to minimize the entry of foreign matter into the closed chamber.

5. The ionization smoke detector of claim 1 in which said one lead is connected with the third electrode.

6. The ionization smoke detector of claim 5 in which a part of said third electrode overlies the insulator wall and said one lead underlies said part and is squeezed between the insulator wall and said electrode part to make electrical contact therewith.

7. The ionization smoke detector of claim 6 in which the third electrode includes a pair of collectors, and means for securing the collectors together with a segment of the insulator wall squeezed therebetween, and said one lead has a portion overlying the insulator wall and sandwiched between one of said pairs of collectors and the insulator wall in the open chamber and another portion extending back through the wall into the closed chamber and sandwiched between the other collector and the insulator wall segment in the closed chamber.

8. The ionization smoke detector of claim 1 in which all of said plurality of leads extend through the insulator wall, one of which being connected with the third electrode and others of which extend out of the chamber assembly between the first and second cup-shaped electrodes for connection with other elements of the sensing circuit.

9. The ionization smoke detector of claim 8 including an insulator member overlying the insulator wall and in which at least one of said leads extending out of the chamber assembly is sandwiched between the wall and the insulator member to prevent electrical coupling thereof with either of the cup-shaped electrodes.

10. The ionization smoke detector of claim 9 in which another one of said leads extending out of the chamber assembly has a segment sandwiched between the insulator wall and one of the electrodes to make electrical connection therewith.

11. An ionization smoke detector having an ionization chamber with a cup-shaped electrode defining a wall of the chamber, another electrode, an insulator wall secured to the cup-shaped electrode at the periphery of an open face thereof defining another wall of the chamber and carrying the other electrode spaced from the cup-shaped electrode, and a sensing circuit responsive to the impedance of the chamber for indicating the presence of smoke, in which the improvement comprises:

- a circuit element of said sensing circuit having a body mounted to the insulator wall on the outside of the chamber by means of at least one of a plurality of leads of the element projecting from the body and through the insulator wall into the chamber, said one lead extending from within to without the chamber between the insulator wall and the periphery of the open face; and
- an insulator member overlying the insulator wall and interposed between the one lead and the periphery of the open face to prevent electrical connection between one lead and the cup-shaped electrode.

12. The ionization smoke detector of claim 11 in which said insulator member is integral with the insulator wall.

13. The ionization smoke detector of claim 11 in which said insulator wall has an opening therethrough at which said other wall is mounted, said opening being formed by cutting a section of insulator material from the wall and said insulator member is formed from at least part of said section.

14. The ionization smoke detector of claim 11 in which said insulator member is a part of said section which is folded over a portion of the insulator wall about a fold line defining an edge of the opening.

15. The ionization smoke detector of claim 11 in which said insulator member is held in a folded position overlying the insulator wall by means including another one of said plurality of leads extending through both the insulator member and the insulator wall and having a segment overlying the insulator member, said insulator wall and insulator member being held together between the overlying segment of said other lead and the circuit element body.

16. The ionization smoke detector of claim 11 in which said insulator member is held in close proximity to the insulator wall at least in part by means of another of said plurality of leads extending through both the insulator wall and the insulator member and having a segment overlying the insulator member, said wall and member being held together between the overlying segment of the other lead and the element body.

17. The ionization smoke detector of claim 16 in which said other lead is connected with the other electrode.

18. The ionization smoke detector of claim 16 in which said other lead extends from within to without the chamber between the insulator wall and the periphery of the open face and makes electrical contact with the cup-shaped electrode.

19. The ionization smoke detector of claim 11 including another cup-shaped electrode defining the wall of another chamber secured to said first-mentioned cup-shaped electrode with the insulator wall and insulator member interposed therebetween, said insulator wall defining an interior wall of the other chamber.

20. The ionization smoke detector of claim 19 in which said element body is within the other chamber, and in which said other chamber is closed and the first chamber is open to ambient air.

21. An ionization chamber assembly of a smoke detector having a sensing circuit for detecting a change in impedance of the chamber, comprising:

a cup-shaped electrode;

an insulator wall secured to the cup-shaped electrode and defining, at least in part, a wall of the chamber; and an active circuit element of said sensing circuit having a body and a plurality of leads projecting from a header portion of the body, said circuit element being mounted on the insulator wall with the header portion protectively pressed against one side of the insulator wall by means of at least one of said leads projecting through a mating hole in said insulator wall from said one side and overlying the other side of the insulator wall opposite the one side.

22. The ionization chamber assembly of claim 21 in which all of said plurality of leads extend through the insulator wall, a portion of said insulator wall being interposed between each of the leads.

23. The ionization chamber assembly of claim 21 in which said body and header portion thereof are enclosed within the chamber and said chamber is substantially closed against ambient air.

24. The ionization chamber assembly of claim 23 including a second cup-shaped electrode defining an outer wall of an open chamber and means for securing it to the first-mentioned cup-shaped electrode with the insulator wall therebetween, said insulator wall defining an interior wall of said open chamber.

25. The ionization chamber assembly of claim 21 including another electrode carried by said insulator wall and means for connecting said one lead with the other electrode.

26. The ionization chamber assembly of claim 21 in which said active circuit element is a field-effect transistor.

27. An ionization chamber for a smoke detector having a detection circuit for sensing a change in the impedance of the chamber, said chamber having a cup-shaped electrode defining a wall of the chamber and an insulator wall mounted to the cup-shaped electrode and defining another wall of the chamber, wherein the improvement comprises:

another electrode mounted on the insulator wall spaced from the cup-shaped electrode and having a portion thereof overlying the wall; and a conductive member connectable with the detection circuit and mounted on the wall, said member sandwiched between the insulator wall and said portion of the other electrode and making electrical contact therewith to electrically couple the detection circuit with the other electrode.

28. The ionization chamber of claim 27 including an insulator member secured to the wall and in which said lead projects out of the chamber between the insulator member and the insulator wall.

29. The ionization chamber of claim 27 in which said wall has an opening therethrough, said electrode is mounted to the wall over said opening, and said conductive member is folded around said wall at said opening to hold it in position for connection with the electrode when mounted.

30. The ionization chamber of claim 27 including another cup-shaped electrode, means for securing the other cup-shaped electrode to the first-mentioned cup-shaped electrode with the insulator wall sandwiched therebetween and an insulator member interposed between the insulator wall and one of the cup-shaped electrodes and in which said conductive member extends between the insulator member and the insulator wall for connection with the detection circuit.

31. The ionization of claim 27 in which said conductive member is one of a plurality of input leads of a circuit element of the detection circuit located within the chamber.

32. An ionization chamber assembly comprising:

a first cup-shaped electrode defining an outer wall of an open chamber;

a second cup-shaped electrode defining an outer wall of a closed chamber;

an insulator wall sandwiched between the first and second cup-shaped electrodes and defining an interior wall of both chambers;

an electrode common to both the open and closed chambers mounted on the insulator wall spaced from both cup-shaped electrodes;

an insulator member sandwiched between one side of the insulator wall and one of the first and second cup-shaped electrodes; and an active circuit element having a body mounted within the closed chamber and a plurality of leads projecting from the body, one of said leads connected with the common electrode and at least another one of said leads extending out of one of said chambers between the insulator member and said wall.

33. The ionization chamber of claim 32 wherein said active circuit element is a transistor with a control lead and transconductive leads, said one lead being connected with the common electrode being the control lead and said other one of said leads being one of said transconductive inputs.

34. The ionization chamber of claim 33 in which said transistor is a field-effect transistor.

35. The ionization chamber of claim 33 in which a portion of said common electrode overlies the insulator wall and said one lead is squeezed between said portion and the insulator wall to make electrical contact with the common electrode.

36. The ionization chamber of claim 35 in which said insulator wall has a hole, and said electrode includes first and second mating collectors secured together at said hole with said wall at the periphery of the hole being sandwiched therebetween and said one lead is folded around the wall at the periphery of the hole with one portion interposed between the first collector and the wall and a second portion interposed between the wall and the second collector.

37. The ionization chamber of claim 32 in which said element body has a header from which said plurality of leads project and said body is mounted to the wall with the header pressed against the wall.

38. The ionization chamber assembly of claim 37 in which all of said plurality of leads extend through the wall, with a portion of the wall being interposed between each of the leads adjacent the header.

39. The ionization chamber assembly of claim 32 in which said circuit element is mounted to the insulator wall by means of at least one of said plurality of leads extending through and overlying the side of the wall opposite the element body.

40. The ionization chamber assembly of claim 39 in which said one lead extends through both the insulator wall and the insulator member, said insulator member being held to the body at least in part by said lead.

41. The ionization chamber assembly of claim 39 in which said other lead extends through the insulator wall adjacent the insulator member.

42. The ionization chamber assembly of claim 32 in which said insulator member is made from a piece of insulator material stock from which said insulator wall is formed.

43. The ionization chamber assembly of claim 42 in which said insulator member is connected to the insulator wall along a fold line partially defining the edge of a hole in the insulator wall.

44. In an ionization chamber assembly having a pair of cup-shaped electrodes each defining the outer wall of one of two ionization chambers, a body of radioactive material, and an insulator wall sandwiched between the pair of cup-shaped electrodes and defining an interior wall common to both chambers, the improvement comprising:

an electrode assembly including a first collector plate with a radiation emission hole, a second collector plate with a radiation emission hole aligned with the hole in the first collector plate, and means for securing the first and second plates together with the radioactive body held therebetween and aligned with both radiation emission holes, said radioactive body blocking communication between the two chambers through the aligned emission holes; and means for mounting the electrode assembly to the insulator wall for communication of the two radiation emission holes with the pair of chambers respectively, radiation from said radiation emission holes respectively ionizing the air in the two chambers.

45. The ionization chamber assembly of claim 44 in which said insulator wall has a hole therethrough and said first and second collector plates are mounted on opposite sides of the wall with annular portions thereof surrounding the hole and said radiation emission holes aligned therewith.

46. The ionization chamber assembly of claim 45 wherein the hole is non-circular and one of said collector plates has an upturned central portion snugly received therewithin.

47. The ionization chamber assembly of claim 46 including means other than said securing means for holding the two collector plates in proper alignment before they are secured together.

48.The ionization chamber assembly of claim 47 wherein said holding means includes a nipple on an inner surface of one of the collector plate and a hole in the other collector plate for mating receipt of the nipple.

49. The ionization chamber assembly of claim 47 including a terminal lead for connecting the electrode assembly with circuitry external of the ionization chambers, said terminal lead having a portion sandwiched between the insulator wall and one of the collector plates and held thereby in electrical contact with the one collector plate.

50. The ionization chamber assembly of claim 45 in which one of said collector plates has a cavity communicating with the radiation emission hole therein, said cavity coaxially being aligned with, and having a transverse dimension greater than that of, the radiation emission hole, said radiation body fitted within said cavity and being sandwiched between annular portions of each of the collector plates surrounding the respective radiation emission holes thereof.

51. The ionization smoke detector of claim 1 in which said one circuit element is a field-effect transistor.

52. The ionization smoke detector of claim 1 in which only one circuit element is contained in the body protectively mounted within the closed chamber.

53. The ionization smoke detector of claim 11 in which only one circuit member is within the body mounted to the insulator wall.

54. The ionization chamber assembly of claim 21 in which said body is a body for only said active circuit element.

55. The ionization chamber assembly of claim 32 in which said body is a body of only said active circuit element.

56. The ionization chamber assembly of claim 44 in which said first and second collector plates are substantially rigid.

* * * * *

UNITED STATES PATENT AND TRADEMARK OFFICE
CERTIFICATE OF CORRECTION

PATENT NO. : 4,075,487

DATED : Feb. 21, 1978

INVENTOR(S) : Larry D. Larsen

It is certified that error appears in the above-identified patent and that said Letters Patent are hereby corrected as shown below:

At column 4, line 48, delete "remainding" and insert --remaining--. At column 6, line 50, delete ""Smoke Sensing Fire Alarm"" and insert --"Detection Circuit",now U.S. Patent 4,083,037,--. At column 7, line 1, after "course" insert --,--. At column 8, line 38, after "between" insert --the--. At column 10, line 24, after "ionization" insert --chamber--; at column 10, at each of lines 49, 55, 57 and 62, after the word "chamber" insert --assembly--. At column 11, line 3, after the word "chamber" insert --assembly--. At column 12, line 19, delete "plate" and insert --plates--; at column 12, line 44, delete "member" and insert --element--.

Signed and Sealed this

*Third* Day of *October 1978*

[SEAL]

*Attest:*

RUTH C. MASON
*Attesting Officer*

DONALD W. BANNER
*Commissioner of Patents and Trademarks*